UNITED STATES PATENT OFFICE.

FREDERICK J. MAYWALD, OF NEW YORK, N. Y.

TANNIN EXTRACT AND PROCESS OF PRODUCING SAME.

No. 894,277.        Specification of Letters Patent.        Patented July 28, 1908.

Application filed June 14, 1904. Serial No. 212,501.

*To all whom it may concern:*

Be it known that I, FREDERICK J. MAY-WALD, a citizen of the United States, residing in the borough of Brooklyn, city of New York, county of Kings, and State of New York, have invented certain new and useful Improvements in Tannin Extracts and Processes of Producing the Same; and I do hereby declare the following to be a full, clear, and exact description of the same, such as will enable others skilled in the art to which it appertains to make and use the same.

My invention relates to the production of a dry friable powder from the commercial tannin extracts which is suitable for all the purposes to which said extracts are customarily put and which contains all their active ingredients in a substantially unchanged condition, chemically speaking.

My process is applicable to the liquid, solid or pitchy extract obtained from sumac, hemlock, oak, chestnut, palmetto, valonia, and other vegetable materials containing tannin.

My invention consists in a method of producing a dry, friable, but water-soluble tannin product, which is substantially non-hygroscopic, or only very slightly hygroscopic; and my invention further consists in the novel tannin product so produced.

Tannin extracts such as above described contain besides the true tannin components, many other substances of a more or less indefinite nature. These substances however are useful in tanning, as well as for other purposes to which such extracts are applied. It is a well known fact that pure tannins do not tan hide in a commercially satisfactory manner, the leather lacking the fullness of body and other desirable characters of the article made with the complete extracts. These other substances are much more hygroscopic than pure tannin and as a result it has hitherto been impossible to prepare these extracts in the commercially desirable form of dry powders. Attempts at complete desiccation of the entire extract have been made, but have not been attended with success, the high heat necessary causing chemical changes both in the tannin components and in the other extractive matter. As a rule therefore, these extracts appear in the trade in the form of liquids or of pitchy masses, generally the latter. This latter form is however extremely inconvenient in practice, being too solid to pour and too sticky to break up, being often in fact like soft asphalt, physically. Occasionally a soft granular mass has been produced by carrying on drying at a high temperature, but the granules tend to agglutinate under ordinary atmospheric conditions of heat and moisture when removed from the container, quickly reproducing the ordinary pasty mass. These objections are well known to those skilled in the art.

One object of my invention is to produce from tannin extracts, such as mentioned, a dry product, which, while having its tanning power unimpaired, is non-hygroscopic, or at most, only slightly hygroscopic, is not affected injuriously by moisture of the air, nor by heat, is friable, permanent, and is readily and completely soluble in water.

Another object is to render the process of preparing the said tannin product simple, easy to carry out, and relatively inexpensive. I have discovered that by admixing other gummy matters with these viscous tannin extracts a new and unexpected result follows, the mixture drying down quietly at low heats and without altering the chemical properties of the tannin or the viscous matters accompanying it, although sundry of said added gummy matters are, in and by themselves, quite hygroscopic.

In carrying out my process, I add to the tannin extract to be solidified a soluble colloidal carbohydrate body, and then evaporate the mixture to dryness. The substance which I prefer to use is dextrin, and it is preferably used in solution. But instead of using dextrin, I may use other similar bodies, as, for example, gum arabic, tragacanth, or other gums of similar type. The products resulting from the mixture of the substances named with tannin extracts, and from the variation of the mixtures, dry rapidly and easily to a powder which is permanent, dry, non-hygroscopic, or only slightly so, and which will not run together upon exposure to moist air or to atmospheric heat. This powder is readily and completely soluble in water.

The following will serve as an example of a method of producing, according to my process, a dry product from tannin extract by the use of dextrin:—To 100 lbs. of tannin extract of 51 degrees Twaddle, are added 15 lbs. of dextrin, either in the form of powder, or in solution in a small amount of water, and the mixture is stirred. The tannin solution is preferably cold at the time of adding the dextrin. When thoroughly mixed, the mixture is evaporated to dryness. The resulting mass is easily reducible to powder, and is permanent, and non-hygroscopic, or only slightly so. The treatment in no way injures or interferes with the action of the tannin, and the dry compound is readily soluble in water.

If desired, the dextrin or other solidifying material used may be added to the tannin extract during the operation of extracting the tannin from its vegetable source, my process being combined with that of producing the extract. And if desired, instead of adding the solidified material to the liquid solution, it may be added to the pasty, pitch-like, or even to the solid, forms of the tannin extract, and I do not, by the term "extract", as herein used, mean to denote only a liquid substance, but intend to include also the pasty, pitch-like, or even dry, form of the tannin extract.

I do not limit myself to the use of a 51 degree Twaddle solution, but may use solutions of different strength. I do not limit myself to the use of any particular proportion of the dextrin or other solidifying agent, as the proportion of such material used may vary somewhat, according to the result desired to be obtained.

Tannin extracts of 51 degrees Twaddle strength usually contain from 60 to 70 per cent. of tannin extractive matter; from which it follows that in the dry product formed from such extract to which 15 per cent. of dextrin has been added, there will be from 18 to 20 per cent., approximately, of dextrin.

What I claim is:

1. The process of preparing a dry friable tannin-containing composition from viscous tannin extracts which consists in adding a colloidal carbohydrate to a viscous tannin extract and evaporating the mixture to a dry friable condition.

2. The process of preparing a dry friable tannin-containing composition from viscous tannin extracts which consists in adding dextrin to a viscous tannin extract and evaporating the mixture to a dry friable condition.

3. As a new article of manufacture a dry, friable tannin-containing composition consisting of a mixture of a colloidal carbohydrate with a tannin-extract from a body yielding viscous extracts.

4. As a new article of manufacture, a dry, friable tannin-containing composition consisting of a mixture of dextrin and a tannin-extract from a body yielding viscous extracts.

In testimony whereof I affix my signature in the presence of two witnesses.

FREDERICK J. MAYWALD.

Witnesses:
H. M. MARBLE,
D. HOWARD HAYWOOD.